(12) United States Patent
Ng et al.

(10) Patent No.: US 12,049,162 B2
(45) Date of Patent: Jul. 30, 2024

(54) SEAT ADJUSTMENT DEVICE FOR A FLEXIBLE SEAT FRAME AND METHOD OF USE

(71) Applicant: Adient US LLC, Plymouth, MI (US)

(72) Inventors: Xin Wei Jolene Ng, Singapore (SG); Joseph Gasko, Commerce Township, MI (US); Reinier Soliven, Oakland Township, MI (US)

(73) Assignee: Adient US LLC, Plymouth, MI (US)

( * ) Notice: Subject to any disclaimer, the term of this patent is extended or adjusted under 35 U.S.C. 154(b) by 0 days.

(21) Appl. No.: 17/663,672

(22) Filed: May 17, 2022

(65) Prior Publication Data

US 2022/0371490 A1 Nov. 24, 2022

Related U.S. Application Data

(60) Provisional application No. 63/190,291, filed on May 19, 2021.

(51) Int. Cl.
*B60N 2/60* (2006.01)
*B60N 2/66* (2006.01)

(52) U.S. Cl.
CPC ............. *B60N 2/6671* (2015.04); *B60N 2/66* (2013.01); *B60N 2/666* (2015.04); *B60N 2/667* (2015.04); *B60N 2/6673* (2015.04)

(58) Field of Classification Search
CPC ...... B60N 2/6671; B60N 2/66; B60N 2/6673; B60N 2/666; B60N 2/667
See application file for complete search history.

(56) References Cited

U.S. PATENT DOCUMENTS

| 5,769,490 A * | 6/1998 | Falzon ................ | B60N 2/6671 297/284.3 |
| 5,823,620 A | 10/1998 | Le Caz | |
| 6,254,186 B1 * | 7/2001 | Falzon ................ | B60N 2/6673 297/284.1 |
| 2004/0108760 A1 * | 6/2004 | McMillen ............ | B60N 2/6671 297/284.4 |
| 2004/0140705 A1 | 7/2004 | McMillen et al. | |
| 2004/0212227 A1 | 10/2004 | Farquhar et al. | |
| 2005/0046252 A1 * | 3/2005 | McMillen ............ | B60N 2/66 297/284.1 |
| 2006/0261653 A1 * | 11/2006 | McMillen ............ | A47C 7/465 297/284.4 |
| 2007/0236063 A1 | 10/2007 | Blendea | |
| 2017/0028888 A1 * | 2/2017 | Seibold ............... | B60N 2/6671 |
| 2019/0329685 A1 * | 10/2019 | Seibold ............... | B60N 2/99 |

OTHER PUBLICATIONS

European Patent Office, European Search Report in Application No. EP 22174115.0, dated Nov. 22, 2022, 8 pages, Munich, Germany.

* cited by examiner

*Primary Examiner* — Syed A Islam

(74) *Attorney, Agent, or Firm* — Marshall & Melhorn, LLC

(57) ABSTRACT

A seat system for a vehicle including a flexible seatback structure and an adjustment device coupled thereto. The adjustment device is configured to alter a contour of a seating surface of the seatback structure by causing at least a portion of the seatback structure to move toward or away from the occupant of the seat system.

15 Claims, 13 Drawing Sheets

SEAT ADJUSTMENT DEVICE FOR A FLEXIBLE SEAT FRAME AND METHOD OF USE

FIELD

The presently disclosed subject matter relates to a seat system, and more particularly to an adjustment device for a flexible seat member and method of use.

BACKGROUND

Conventional seat systems comprise a seatback assembly and a seat base assembly. Each of the assemblies typically include cushions having bolsters. Conventional bolsters, however, only provide a localized change to the contour of the seatback assembly and the seat base assembly. They do not provide for an increased bolster contour. As a result, the seatback assembly and the seat base assembly, each have an interrupted contour and cushion contour with localized pressure points.

Seat systems that have adjustment devices for their various features are well-known. The adjustment device may be such as for comfort and/or positioning of a seat occupant. Often, however, the adjustment devices are overly complicated, heavy and unreliable. Further, the known seat adjustment devices may not provide the type or degree of adjustability desired by today's seat occupant.

In view of the disadvantages associated with the prior art, it would be advantageous for an adjustment device for a seat system to be simple, lightweight, highly reliable and capable of providing a wide range of types and degrees of adjustment to satisfy the subjective preferences of many different sizes, shapes, and types of occupants.

SUMMARY

In concordance and agreement with the present disclosure, an adjustment device for a seat system which is simple, lightweight, highly reliable and capable of providing a wide range of types and degrees of adjustment to satisfy the subjective preferences of many different sizes, shapes, and types of occupants, has surprisingly been discovered.

In one embodiment, an adjustment device for a seat system, comprises: at least one actuating element connected to at least one strap extending at least partially across a flexible member, wherein the adjustment device is configured to alter a contour of a seating surface of the seat system.

As aspects of certain embodiments, the seating surface is configured to engage at least a lumbar portion of an occupant of the seat system.

As aspects of certain embodiments, the adjustment device is actuated such that at least a portion of the at least one strap moves a portion of said flexible member in one or more of an inward direction toward an occupant of the seat system and an outward direction away from the occupant of the seat system.

As aspects of certain embodiments, the portion of the flexible member is a lateral portion defining a bolster of the seat system.

As aspects of certain embodiments, the flexible member is formed from a thermoplastic elastomer.

As aspects of certain embodiments, the flexible member is a single, integrally formed, one-piece structure.

As aspects of certain embodiments, the at least one actuating element is at least one of a cable, a string, a wire, and a chain.

As aspects of certain embodiments, the at least one actuating element is coupled to the at least one strap by at least one connector.

As aspects of certain embodiments, the at least one actuating element is connected to a coupling mechanism and another actuating element.

As aspects of certain embodiments, the at least one actuating element is coupled to a seat frame of the seat system by at least one guide structure.

As aspects of certain embodiments, the at least one guide structure includes a mount portion, an extension portion, and a retainer portion, and wherein the mount portion is coupled to the seat frame, the extension portion extends the retainer portion a fixed distance away from the seat frame, and the retainer portion is coupled to the at least one actuating element.

As aspects of certain embodiments, at least a portion of the at least one actuating element is disposed within a conduit.

As aspects of certain embodiments, the flexible member is a seatback structure of the seat system.

As aspects of certain embodiments, the adjustment device is connected to an actuator, wherein activation of the actuator causes the adjustment device to alter the contour of the seating surface of the flexible member.

As aspects of certain embodiments, the actuator is directly connected to the at least one actuating element.

As aspects of certain embodiments, the adjustment device further includes a coupling mechanism connected to the at least one actuating element, and wherein the actuator is connected to the coupling mechanism by another actuating element.

In another embodiment, a seat system for a vehicle, comprises: a seat frame; a seatback structure coupled to the seat frame; an adjustment device coupled to the seat system, the adjustment device including a first actuating element, a second actuating element, and at least one strap extending at least partially across the seatback structure, wherein the adjustment device is configured to alter a contour of a seating surface of the seatback structure; and an actuator connected to the adjustment device.

As aspects of certain embodiments, at least one of the first actuating element and the second actuating element is directly connected to the actuator.

As aspects of certain embodiments, the adjustment device further includes a coupling mechanism, wherein the coupling mechanism is connected to the actuator by a third actuating element.

In yet another embodiment, a method of adjusting a seat system, comprises: providing a seat frame, a flexible member coupled to the seat frame, an adjustment device coupled to the seat system, the adjustment device including at least one actuating element and at least one strap extending at least partially across the flexible member, and an actuator connected to the adjustment device; and activating the actuator move the adjustment device and alter a contour of a seating surface of the flexible member.

BRIEF DESCRIPTION OF THE DRAWINGS

The advantages of the seat adjustment device and method of use will become readily apparent to those skilled in the art from the following detailed description when considered in the light of the accompanying drawings in which.

DETAILED DESCRIPTION

It is to be understood that the device and method may assume various alternative orientations and step sequences, except where expressly specified to the contrary. It is also to be understood that the specific devices and processes illustrated in the attached drawings, and described in the following specification are simply exemplary embodiments of the concepts defined herein. Hence, specific dimensions, directions or other physical characteristics relating to the embodiments disclosed are not to be considered as limiting, unless expressly stated otherwise.

Figure 1:
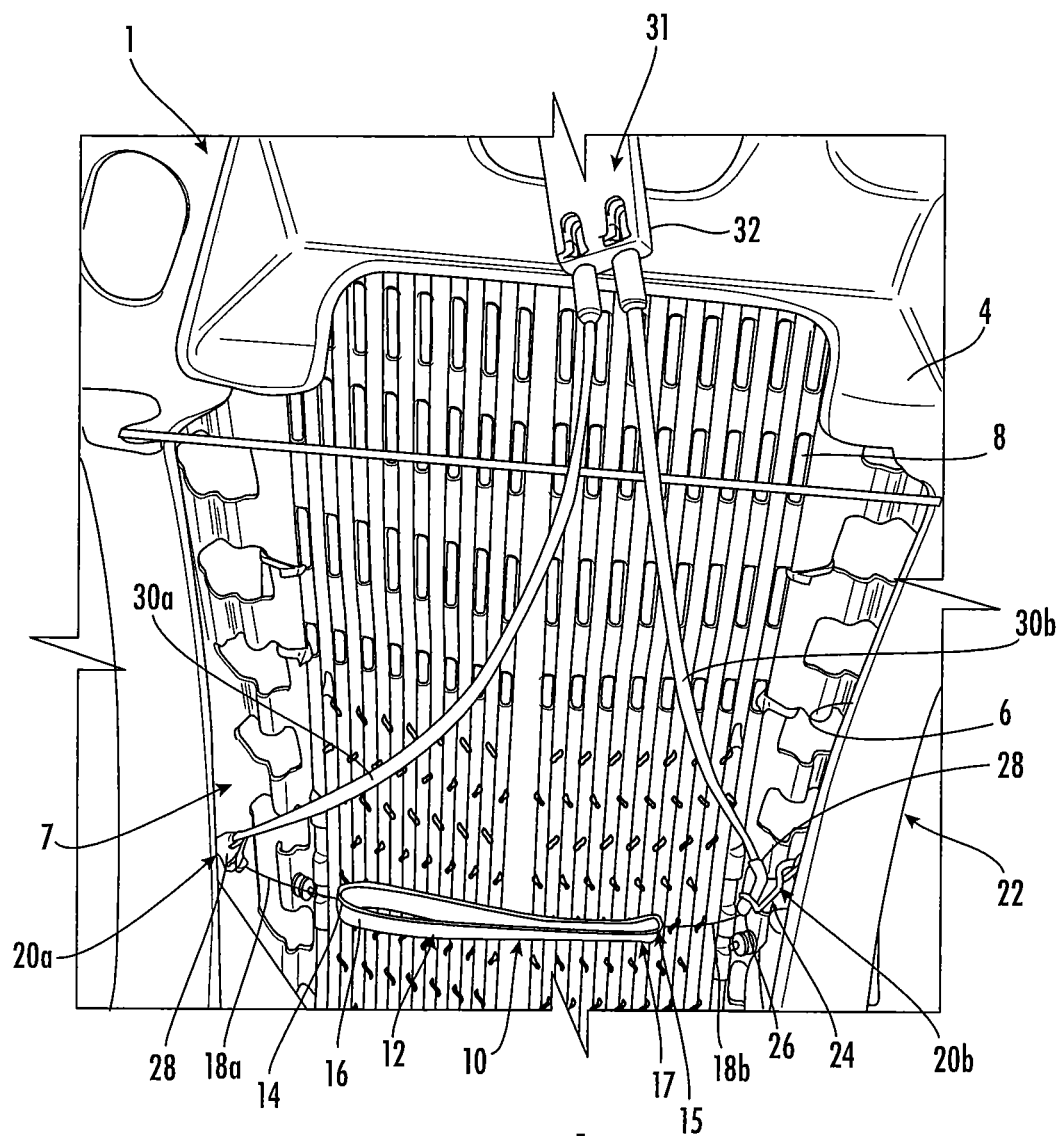
FIG. 1 is a rear view of one embodiment of an adjustment device for a seat system.

FIG. 1 is a partial perspective view of a seat system 1. The seat system 1 may comprise a seat frame 2, a seat base structure (not depicted), and a seatback structure 7. The seat frame 2 may extend entirely, or partially, about the seat base structure and the seatback structure 7. The seat frame 2 may be constructed of a single piece, or two or more pieces, which may be connected together. In one embodiment, the seat frame 2 may be constructed of a robust material, such as metal, which may include steel, but other materials, such as composites, plastics, and/or fiberglass may be used.

A seat base portion (not depicted) the seat frame 2 may be directly or indirectly connected to the ground or a vehicle framework (not depicted) and/or a seatback portion 4 of the seat frame 2. The connection between the ground or the vehicle framework and/or the seatback portion 4 of the seat frame 2 may be such that relative movement is permitted.

The seat base portion of the seat frame 2 may entirely or substantially entirely enclose or surround a seat base center section (not depicted). In one embodiment, the seat base center section of the seat base portion may be substantially open where the seat frame 2 defines a perimeter of the seat base center section. The seat base structure may extend partially or entirely across the seat base center section of the seat base portion. In these embodiments, the seat base structure may extend from a front portion of the seat frame 2 to a rear portion of the seat frame 2 and from one side of the seat frame 2 to the other side of the seat frame 2.

Similarly, the seatback portion 4 of the seat frame 2 may entirely or substantially entirely enclose or surround a seatback center section 6. In one embodiment, the seatback center section 6 of the seatback portion may be substantially open where the seat frame 2 defines a perimeter of the seatback center section 6. The seatback structure 7 may extend partially or entirely across the seat base center section 6 of the seatback portion. In these embodiments, the seatback structure 7 may extend from an upper portion of the seat frame 2 to a lower portion of the seat frame 2 and from one side of the seat frame 2 to the other side of the seat frame 2.

Each of the seat base structure and the seatback structure 7 may be constructed without any apertures 8, but it may be preferred to provide a plurality of apertures 8 formed therein to assist with certain aspects of comfort, shape, conformability and flexibility. The apertures 8 may have different shapes and sizes, as shown the figures to provide the above-noted aspects. At least a portion of the seat base structure and/or the seatback structure 7 without apertures 8 may be connected in whole or in part to the seat frame 2.

The seat base structure may include a seat base structure surface for engaging and supporting at least a buttock portion and a leg portion of a user. The seat base structure may be connected to the seatback structure 7. The seatback structure 7 may include a seatback structure surface 9. The seatback structure surface 9 engages at least a lumbar portion and a shoulder portion of the user. The seat base structure and the seatback structure 7 may be constructed partially or entirely of a variety of materials including plastics, composites, fiberglass, and/or rubber compounds. Further, each of the seat base structure and the seatback structure 7 may be partially or entirely constructed of metal, such as in the form of coil and/or leaf springs, or other biasing structures. Most any material capable of providing a memory elastic function or partial memory elastic function may be preferred. In one embodiment, each of the seat base structure 3 and the seatback structure 7 may be a flexible member preferably formed of thermoplastic elastomers (TPE). The seat base structure may be formed in one-piece to provide an integrally formed one-piece seat base structure. The seatback structure 7 may be formed in one-piece to provide an integrally formed one-piece seatback structure 7.

Figure 2:
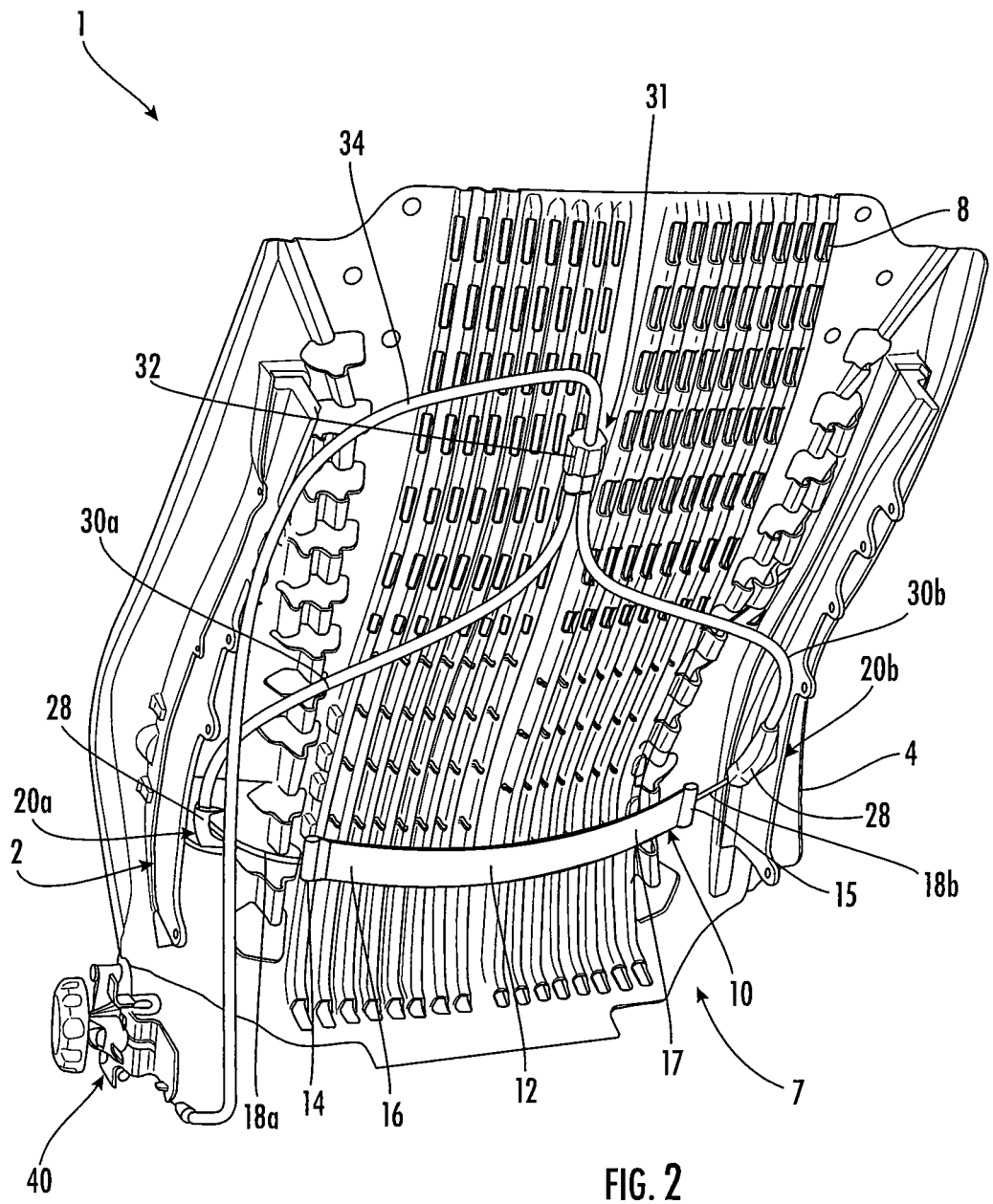
FIG. 2 is a rear perspective view of the adjustment device of FIG. 1.
Figure 3:
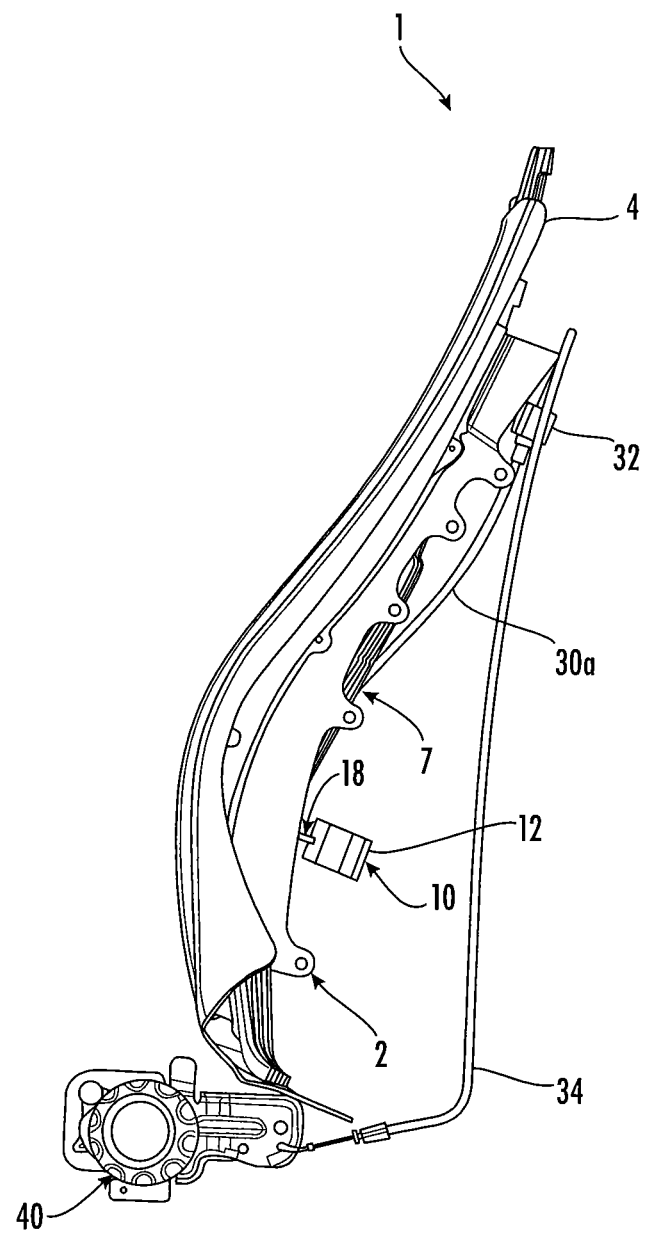
FIG. 3 is a side view of the adjustment device of FIG. 1.
Figure 5:
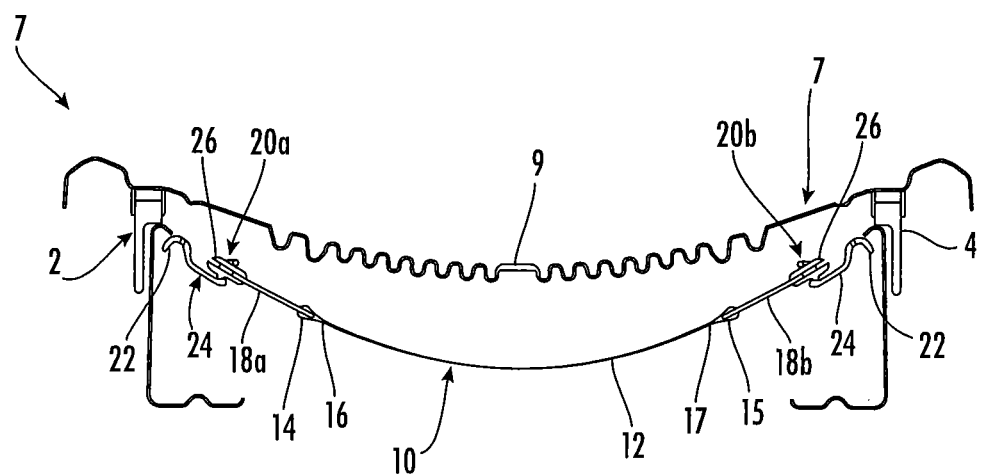
FIG. 5 is a top, cross-sectional view through the adjustment device of FIG. 1.

As best seen in FIGS. 1, 2 and 5, the seat system 1 may further comprise at least one adjustment device 10. The at least one adjustment device 10 may be employed to adjust at least a portion of at least one of the seat base structure 3 and the seatback structure 7. For simplicity, only the at least one adjustment device 10 employed with the seatback structure 7 is described hereinafter. It should be appreciated, however, that the at least one adjustment device 10 may be employed with the seat base structure, if desired.

In certain embodiments, the adjustment device 10 may be at least one strap 12 located across the seatback structure 7. A location of the strap 12 may vary, but in the depicted example, the strap 12 may be located in a lower third of a height of the seatback structure 7.

While one strap 12 is depicted, it is permissible for there to be more than one strap 12. The straps 12 may be equally or unequally spaced from one another. Further, the straps 12 may all be the same length and width or their length and width may vary. In the depicted embodiment, the single strap 12 may have a substantially constant width, thickness and length.

A thickness of the strap 12 may be preferably less than a thickness of the seat frame 2. In a more preferred embodiment, the thickness of the strap 12 may be such as approximately about ⅛ to about ¾ inch.

The strap 12 may extend approximately from one side of the seatback structure 7 to the other side of the seatback structure 7. The strap 12 may be a continuous, integrally formed, unitary and one-piece device, or it may be constructed of a number of different pieces and structures. Further, the strap 12 may be hollow, partially hollow, or it may have a solid construction. Regardless of its constructions, it is preferred that the strap 12 is constructed of a material that is at least partially capable of being tensioned, or exerting tension. Various materials may be employed to produce the strap 12 such as plastic, resin, composite, metal, rubber compound and/or fiberglass, for example. The strap 12 may also be constructed to have either elastic or non-elastic properties.

In the embodiment depicted in the figures, the strap 12 may have at least one connector 14, 15 disposed on each end 16, 17, respectively. Each of the connectors 14, 15 may be adapted to secure at least one actuating element 18 (e.g. a cable, a string, a wire and/or a chain) to the strap 12. Preferably, a first actuating element 18a is attached to the connector 14 and a second actuating element 18b is attached to the connector 15. The connectors 14, 15 may be such as clamp-like structures that secure the actuating elements 18a, 18b to the strap 12, but other suitable connector types may be employed, if desired.

Figure 4:
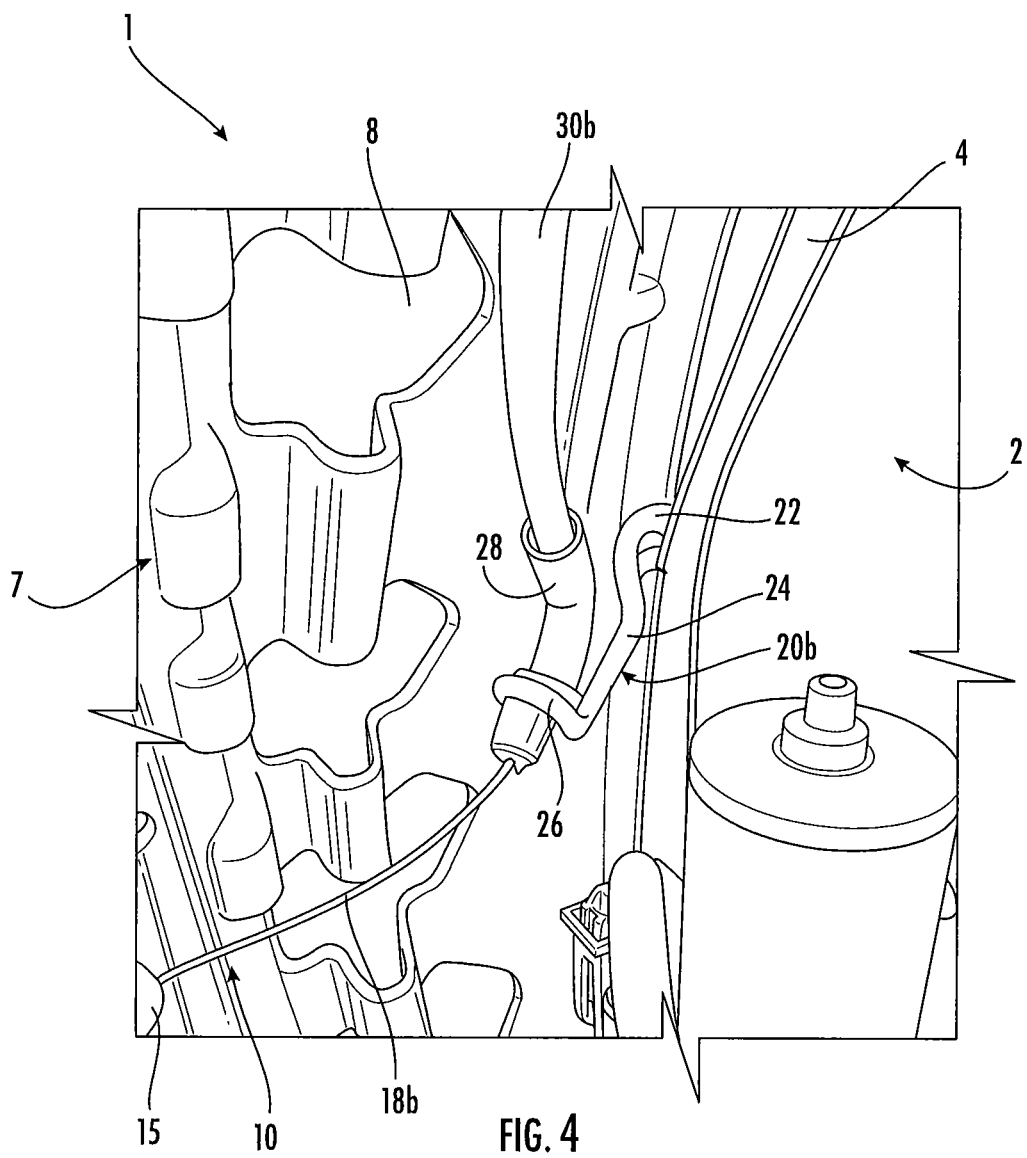
FIG. 4 is a perspective view of a detail of the adjustment device of FIG. 1.

Each of the actuating elements 18a, 18b may extend to a corresponding one of guide structures 20a, 20b. In the depicted embodiment, each of the guide structures 20a, 20b may be attached to the seat frame 2. More particularly, each of the guide structures 20a, 20b may be attached to the seat frame 2 at approximately the same vertical location on the seatback portion 4. The guide structures 20a, 20b may be comprised of one or more parts. As more clearly shown in FIG. 4, each of the guide structures 20a, 20b comprises a mount portion 22 attached to the seatback portion 4 of the seat frame 2, an extension portion 24, and a retainer portion 26. In some embodiments, the mount portion 22 may be hooked onto the seat frame 2. The extension portion 24 extends the retainer portion 26 a fixed distance away from the seat frame 2 and may also function to route the respective one of the actuating elements 18a, 18b. The retainer portion 26 may be such as a loop or other structure to route the respective one of the actuating elements 18a, 18b, hold the respective one of the actuating elements 18a, 18b, and/or a connecting end 28 of conduits 30a, 30b for the respective one of the actuating elements 18a, 18b.

Each of the conduits 30a, 30b may be a tubular-like structure that at least partially houses the respective one of the actuating elements 18a, 18b therein. The actuating elements 18a, 18b may extend at least partially through the conduits 30a, 30b along the seat frame 2, but the actuating elements 18a, 18b and the conduits 30a, 30b may be routed in other locations. The conduits 30a, 30b may help to protect the actuating elements 18a, 18b, and may be configured to help the actuating elements 18a, 18b selectively slide therein. Thus, in some cases, a lubricant or other similar material (not depicted) may be located on the actuating elements 18a, 18b and/or within the conduits 30a, 30b.

The conduits 30a, 30b, with the actuating elements 18a, 18b located therein, may extend from each side of the strap 12, or the guide structures 20a, 20b, where it may be routed to a central location 31. In the depicted embodiment, the central location 30 may be behind the seatback structure 7 and the seatback portion 4 of the seat frame 2. FIG. 2 shows the central location 30 in an area approximately centered on the seatback structure 3, however, other locations are permissible.

Regardless where the central location 31 is positioned, it may be preferred to have a coupling mechanism 32 located there. The coupling mechanism 32 may be a mechanical or electro-mechanical device that mechanically or electro-mechanically connects the actuating elements 18a, 18b to a single actuating element 34. The single actuating element 34 may then extend to an actuator 40. While the coupling mechanism 32 may be employed in certain embodiments, one is not required in all embodiments. Instead, the actuating elements 18a, 18b extending from the opposite sides of the strap 12 may extend directly to the actuator 40.

The actuator 40 may be a manually operated device, and/or an electro-mechanical device (such as a motor), that is configured to push and pull at least one of the actuating elements 18a, 18b, 34 when actuated. It maybe preferred that the actuator 40 has a lock feature (not depicted) that prevents the at least one of the actuating elements 18a, 18b, 34 from moving unless the actuator 40 may be specifically engaged to push or pull on the at least one of the actuating elements 18a, 18b, 34. The actuator 40 may be located on or near the seat frame 2.

It may be appreciated that when the at least one of the actuating elements 18a, 18b, 34 are pulled by the actuator 40, the strap 12 may be pulled taut or at least tauter than it was before being activation of the actuator 40. The strap 12 acts on the flexible seatback structure 7 to urge it forward, or at least a portion of the seatback structure 7 adjacent the strap 12 moves in a first direction towards the occupant of the seat system 1.

This has the effect of removing any gaps between the seatback structure 7 (which may include the cushioning thereon) and the occupant. As the strap 12 and the seatback structure 7 move forward in the first direction, they will contact the occupant and the occupant may also be urged forward in the first direction as well. If the strap 12 is in the location depicted in the figures, the strap 12 may function to provide lumbar support to the occupant. If the strap 12, or straps 12, are in a different location or various other locations, they may function to conform or relax portions of the seatback structure 7 in those locations. In certain embodiments, the adjustment device 10 is employed to provide the occupant with an increased bolster support, which changes the contour of the seatback structure surface 9.

It may be appreciated that the actuating elements 18a, 18b, 34 can be relaxed and the seatback structure 7 may move in an opposite second direction away from the occupant and return to its original, or partially original, position. This may be through the weight of the occupant in the seat system 1, by biasing members (e.g. springs) associated with the adjustment device 10, or by by seatback structure 7, the actuating elements 18a, 18b, 34, and/or strap 12 being rigid enough to push the strap 12 into a location. If the strap 12 is connected to the seatback structure 7, the seatback structure 7 can be pushed back to its original location. Such functionality may have the effect of reducing pressure or pressure points from the seat system 1 on the occupant.

It may be that only a single actuating element is used. The single actuating element may be used with or without the strap 12. The single actuating element can be located within a conduit or without. The single actuating element may be similarly supported on the seatback portion 4 of the seat frame 2, and extend across at least a portion of the seatback structure 7. The single actuating element may be similarly connected to the actuator 40 to function in the same or similar manner as described above.

In some cases, a cushioning material (not depicted) may be applied in whole or in part to the seat frame 2, the seat base structure, and/or the seatback structure 7. The cushioning material provides a soft, cushioning material between the occupant and the seat base structure, the seatback structure 7, and/or the seat frame 2. A covering material (not depicted), such as a fabric or leather material, may extend over the cushioning material to provide additional comfort features and to also provide aesthetic value to the seat system 1. The covering material may also extend over and enclose the strap 12, cables, guide structure and/or cable joining device.

Turning now to FIGS. 6-10 another embodiment of a seat system 42 is schematically depicted. The seat system 42 may comprise a seat frame 44, a seat base structure 45, and a seatback structure 46. The seat frame 44 may extend entirely, or partially, about the seat base structure 45 and the seatback structure 46. The seat frame 44 may be constructed of a single piece, or two or more pieces, which may be connected together. In one embodiment, the seat frame 44 may be constructed of a robust material, such as metal, which may include steel, but other materials, such as composites, plastics, and/or fiberglass may be used.

The seat base portion 45 of the seat frame 44 may be directly or indirectly connected to the ground or a vehicle framework (not depicted) and/or a seatback portion 48 of the seat frame 44. The connection between the ground or the vehicle framework and/or the seatback portion 48 of the seat frame 44 may be such that relative movement is permitted.

The seat base portion 45 of the seat frame 44 may entirely or substantially entirely enclose or surround a seat base center section (not depicted). In one embodiment, the seat base center section of the seat base portion 45 may be substantially open where the seat frame 44 defines a perimeter of the seat base center section. The seat base structure may extend partially or entirely across the seat base center section of the seat base portion 45. In these embodiments, the seat base structure may extend from a front portion of the seat frame 44 to a rear portion of the seat frame 44 and from one side of the seat frame 44 to the other side of the seat frame 44.

Similarly, the seatback portion 48 of the seat frame 44 may entirely or substantially entirely enclose or surround a seatback center section 50. In one embodiment, the seatback center section 50 of the seatback portion may be substantially open where the seat frame 44 defines a perimeter of the seatback center section 50. The seatback structure 46 may extend partially or entirely across the seat base center section 50 of the seatback portion. In these embodiments, the seatback structure 46 may extend from an upper portion of the seat frame 44 to a lower portion of the seat frame 44 and from one side of the seat frame 44 to the other side of the seat frame 44.

Each of the seat base structure and the seatback structure 46 may be constructed without any apertures 52, but it may be preferred to provide a plurality of apertures 52 formed therein to assist with certain aspects of comfort, shape, conformability and flexibility. The apertures 52 may have different shapes and sizes, as shown the figures to provide the above-noted aspects. At least a portion of the seat base structure and/or the seatback structure 46 without apertures 52 may be connected in whole or in part to the seat frame 44.

The seat base structure may include a seat base structure surface for engaging and supporting at least a buttock portion and a leg portion of a user. The seat base structure may be connected to the seatback structure 46. The seatback structure 46 may include a seatback structure portion 54. The seatback structure portion 54 engages at least a lumbar portion and a shoulder portion of the user.

The seat base structure, the seatback structure 46 and/or the seatback structure portion 54 may be constructed partially or entirely of a variety of materials including plastics, composites, fiberglass, and/or rubber compounds. Further, each of the seat base structure, the seatback structure 46 and/or the seatback structure portion 54 may be partially or entirely constructed of metal, such as in the form of coil and/or leaf springs, or other biasing structures. Most any material capable of providing a memory elastic function or partial memory elastic function may be preferred. In one embodiment, each of the seat base structure and the seatback structure 46 may be a flexible member preferably formed of thermoplastic elastomers (TPE). The seat base structure may be formed in one-piece to provide an integrally formed one-piece seat base structure. The seatback structure 46 may be formed in one-piece to provide an integrally formed one-piece seatback structure 46.

As best seen in FIGS. 6-10, the seat system 42 may further comprise at least one adjustment device 56. The at least one adjustment device 56 may be employed to adjust at least a portion of at least one of the seat base structure and the seatback structure 46. For simplicity, only the at least one adjustment device 56 employed with the seatback structure 46 is described hereinafter. It should be appreciated, however, that the at least one adjustment device 56 may be employed with the seat base structure, if desired.

The at least one adjustment device 56 may be comprised of at least one biasing device. The at least one biasing device may connected to the seat system 42, such as the seat frame 44 and/or the seat back structure 46. The connection may be such as a fixed connection, such as integrally formed, one-piece and unitary with structures 44 and/or 46, or the connection may be one that permits selective attachment and removal. Devices associated with the latter connection may be such as mechanical fasteners, male/female coupling or the like.

In one embodiment, the at least one biasing device 58 may be such as an electric motor. The electric motor may be connected to a source of electrical power and a controls module. The controls module may be used to selectively signal the source of electrical power to energize the motor, and then to turn the motor off. The controls module may be connected to a button or the like that permits the occupant to turn the motor one and off. Additionally, or alternatively, the controls module may be connected to others modules and/or sensors (e.g., occupant sensors, pressure sensors in the seat, temperature sensors, and/or vehicle performance sensors such as speed, braking, turn rate or angle or the like) that that may provide an input to the module to turn the source of electrical power on or off.

The electric motor may have an output shaft 59 that is adapted to rotate either clockwise or counterclockwise. It may also be permissible for the electric motor to alternatively have a push/pull output shaft, as may be appreciated from the below.

In one embodiment, the at least one biasing device 58 may be located on one side of the seat system 42. It may be preferred that the at least one biasing device 58 is located in a lower side of the seat system 42, such as near the intersection of the seat base portion 45 and the seatback structure 46.

Some embodiments may have an end portion 60 of a cable 62 attached to the output shaft 59 of the motor. The end portion 60 may be attached such that the cable 62 is fixed to the output shaft 59.

While a cable 62 is mentioned, other structures may be used. These structures include, but are not limited to, wire, straps, cords, films and/or strings made of manmade and/or natural materials. In some embodiments, a cable 62 constructed of wrapped wires may be used.

Figure 10:
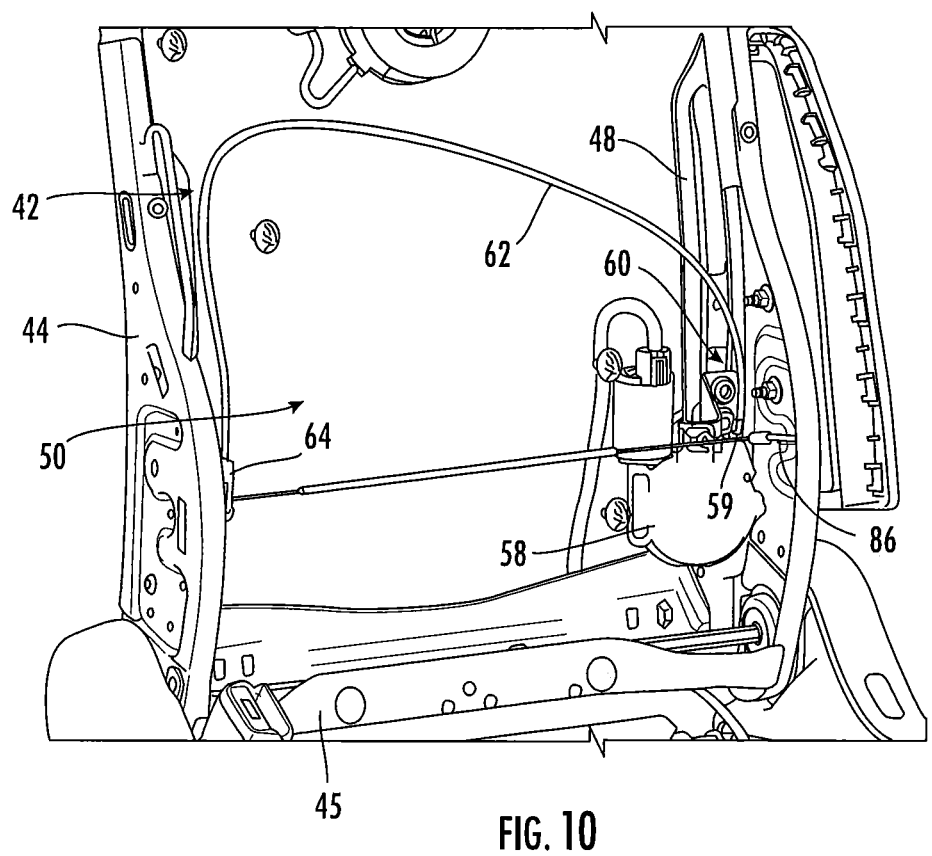
FIG. 10 is a detail from FIG. 6.

The cable 62 may extend from the output shaft 59 of the motor at least partially across the seatback center section 50. The figures depict one possible path for the cable 62, but other paths are permissible. As shown in FIG. 10, one possible path defines a generally trapezoidal shape. In one embodiment, the cable 62 has an arcuate path initially extending upward, generally parallel the seat frame 44. At some point, the cable 62 may angle inwardly from the seat frame 44 toward the seatback center section 50. In one embodiment, the cable 62 extends from one side of the seat frame 44 to the other side of the seat frame 44. As the cable 62 extends across the seatback center section 50, it may angle downwardly toward the seat base structure 45. Adjacent the seat frame 44, the cable 62 may extend generally parallel the seat frame 44.

Figure 9:
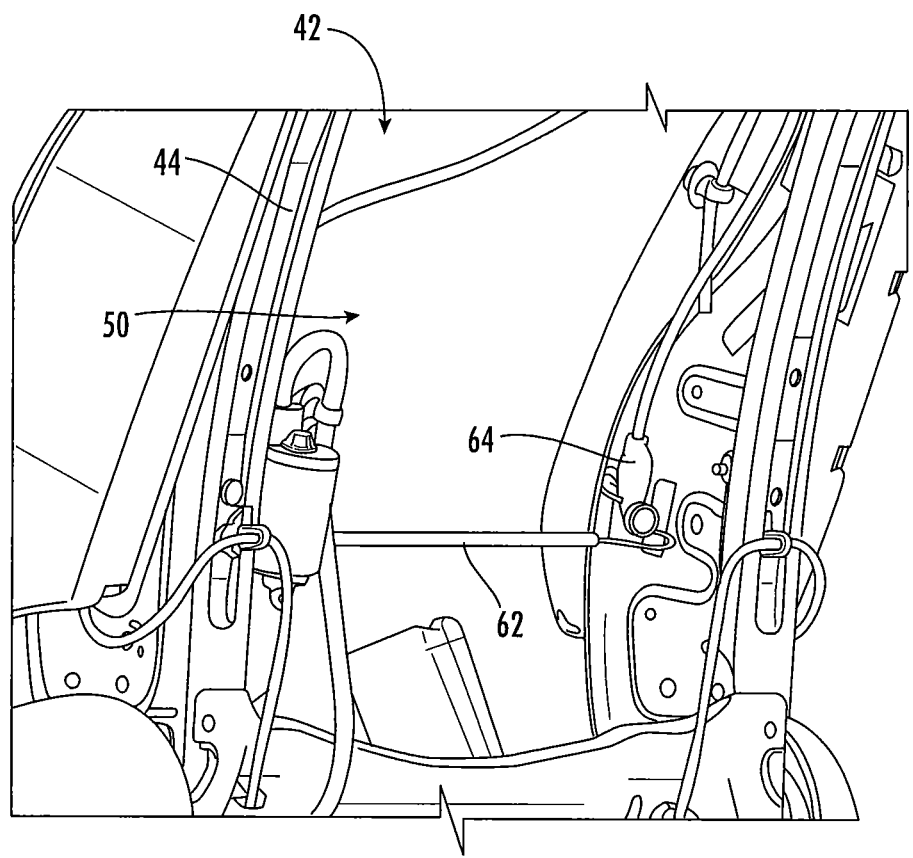
FIG. 9 is a detail from FIG. 6.

As shown in FIG. 9, the cable 62 may be connected to a first cable support 64 near the seat frame 44 opposite the motor; the first cable support 64 may be generally coplanar with the motor. The first cable support 62 may be sleeve-like, such as hollow, in its structure in that it may receive the cable 62 at least partially therein. The first cable support 64 may guide and redirect the cable. In one example, the first cable support 64 may generally redirect the cable 62 from a generally downward orientation to along the seat frame 44 to a generally transverse direction, such as toward or away from the seat back structure portion 46. The first cable support 64, or just the cable 62 by itself, may also redirect the cable inwardly such as toward the at least one biasing device 58. The first cable support 64 may be connected, such as rigidly connected to the seat frame 44.

The cable 62 may extend in a generally planar fashion across the seat back structure portion 54 toward the at least one biasing device 58, as shown in FIG. 9.

Figure 11:
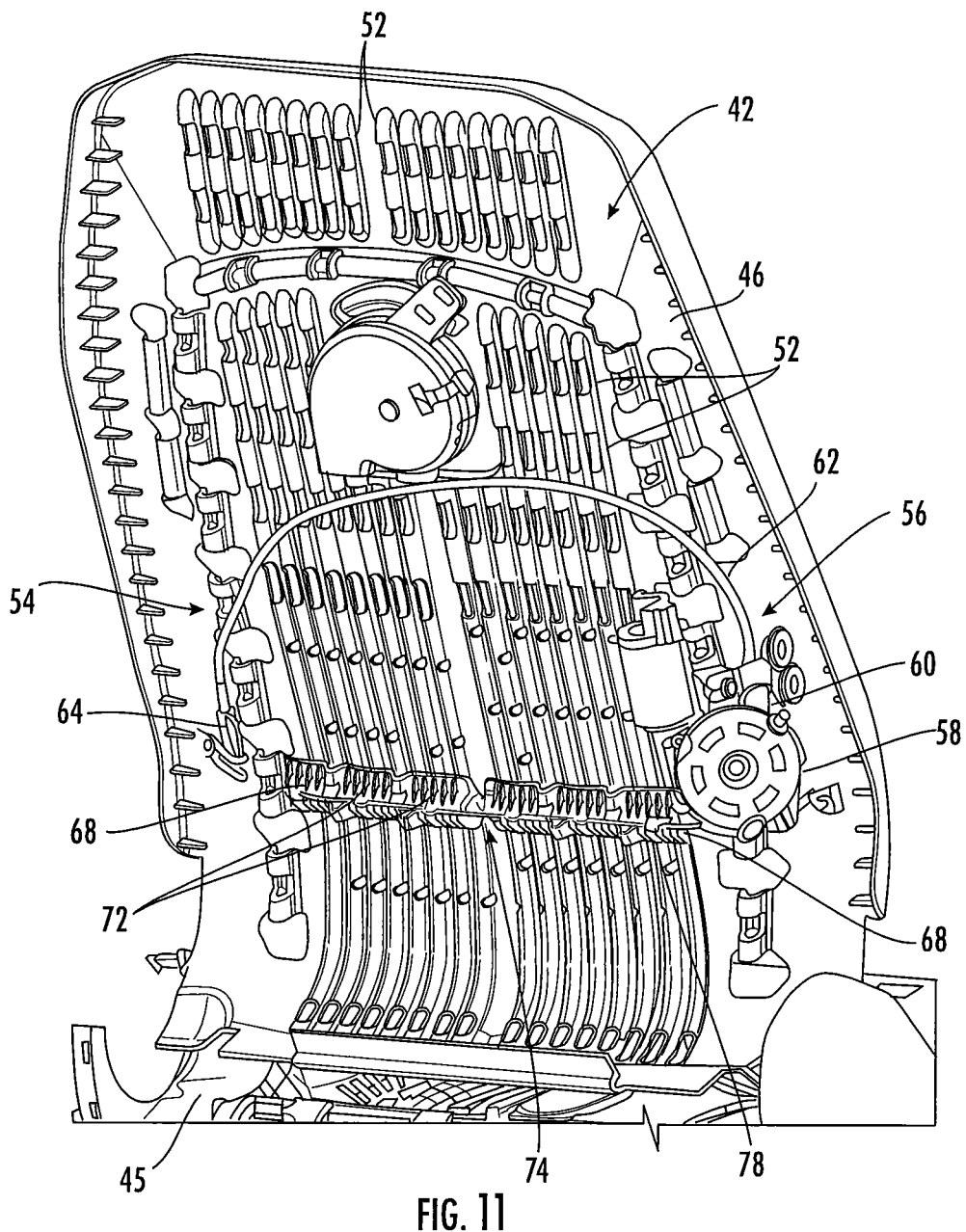
FIG. 11 is a partial rear perspective view of another embodiment of an adjusting device for a seat system.
Figure 12:
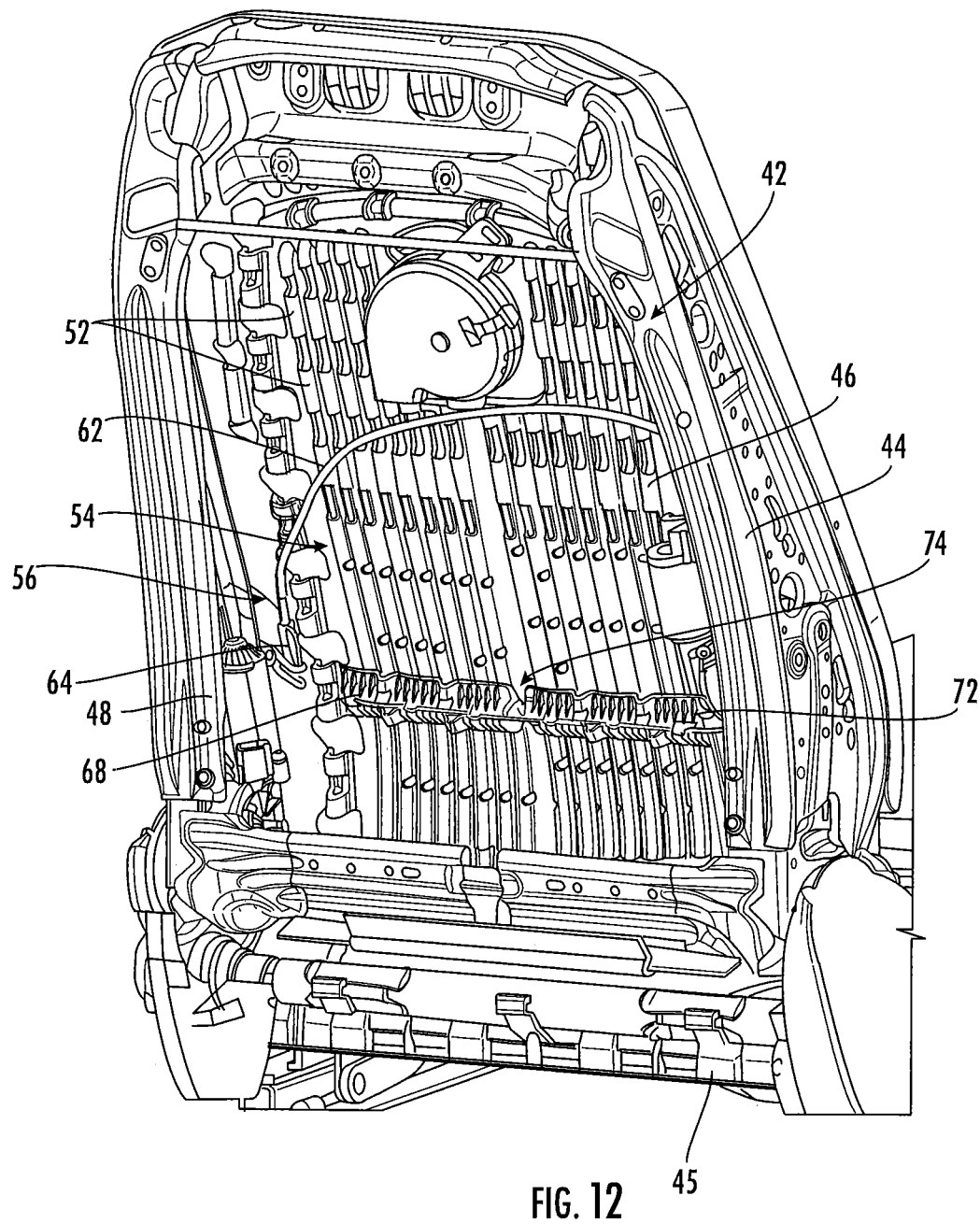
FIG. 12 is another view of the system in FIG. 11.

In some embodiments, the cable 62 may contact and/or be supported by one or more seat cable structures. One embodiment of seat cable structures 66 is depicted in FIGS. 6-7, while another embodiment of seat cable structures 68 is depicted in FIG. 11-13.

The seat cable structure 66 may be connected to, such as extend from the seat back structure 46. In some embodiments, such as shown in the noted figures, the seat cable structure 66 is may be one piece, unitary and integrally formed with the seat back center structure 46. In other cases, the seat cable structure 66 may be separately formed and attached, such as with welding, adhesives and/or mechanical fasteners, to the seat back structure 46.

Both embodiments in the figures depict the seat cable structure 65 as comprising a plurality of individual structures 66, 68 which maybe vertically coplanar with one another on the seat back structure 46. The structures 66, 68 may be separated from one another by gaps 74. The gaps 74 may be equidistant, or the gaps 74 may vary.

Figure 6:
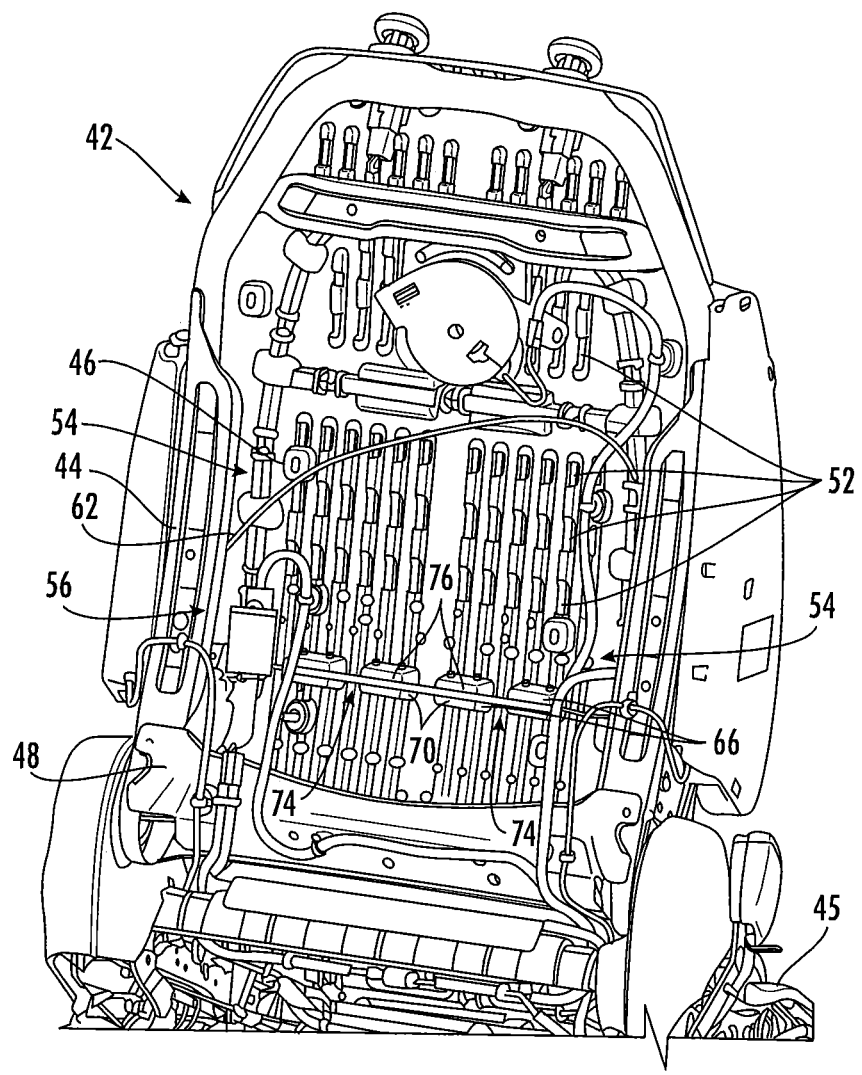
FIG. 6 is a partial rear perspective view of another embodiment of an adjusting device for a seat system.
Figure 7:
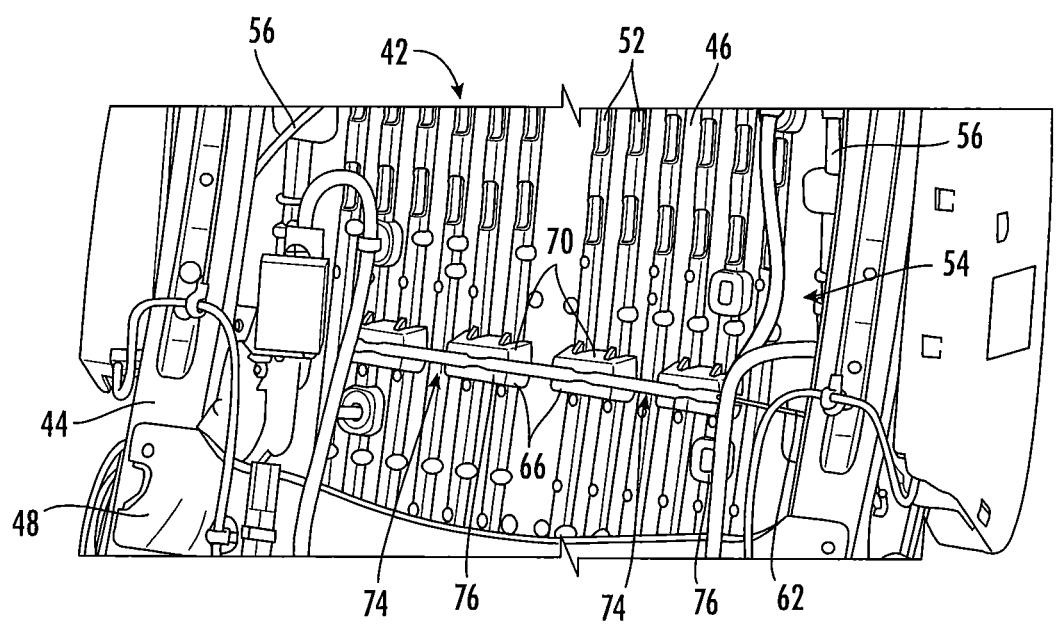
FIG. 7 is a detail from FIG. 6.
Figure 8:
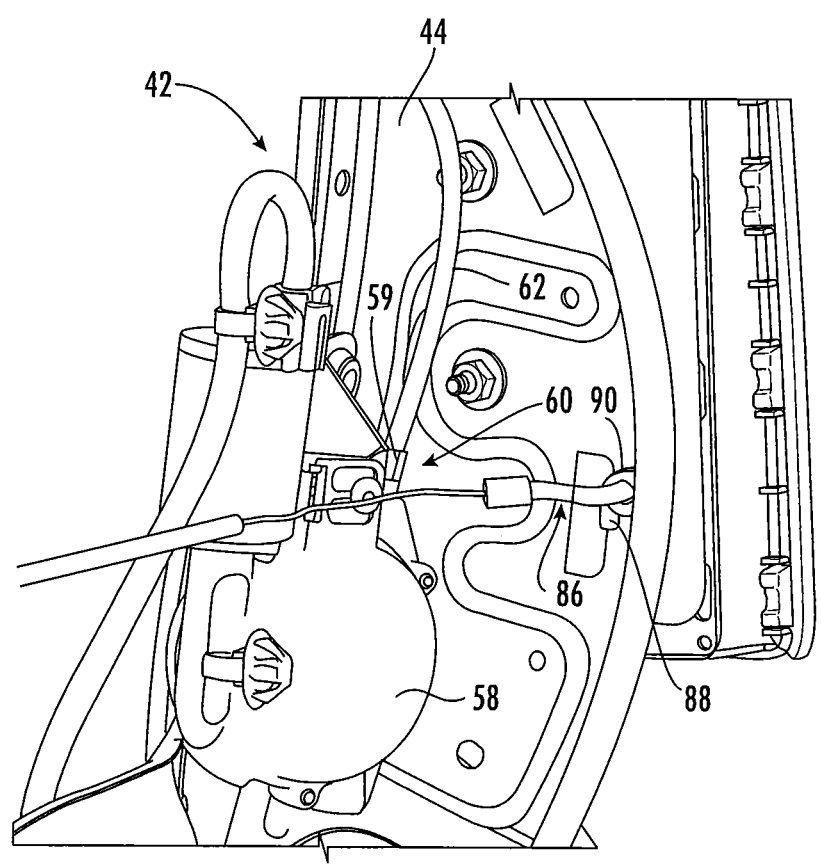
FIG. 8 is a detail from FIG. 6.
Figure 13:
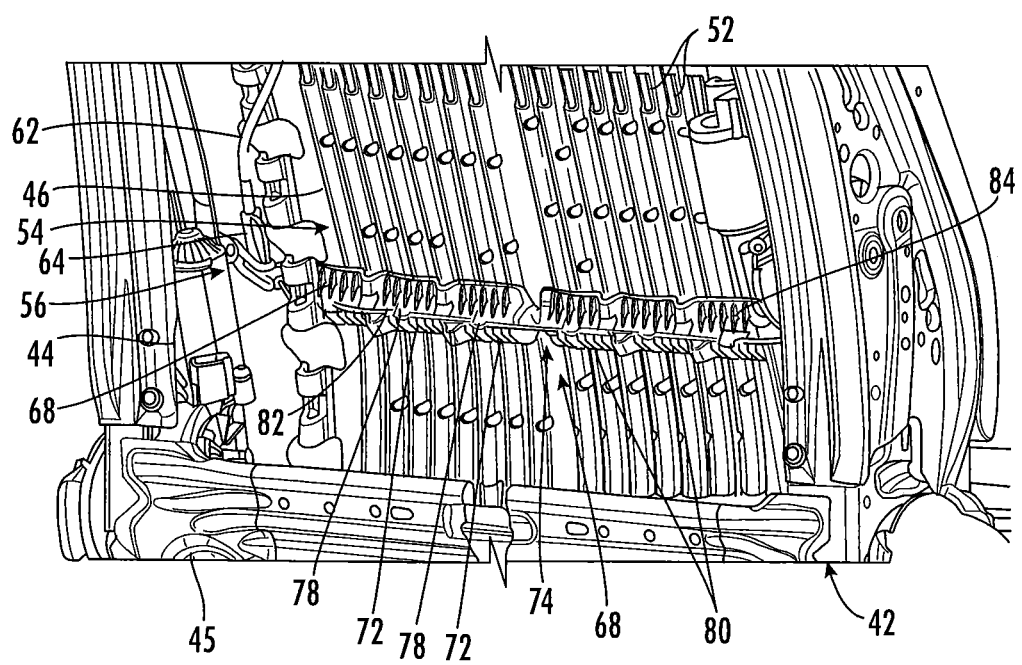
FIG. 13 is a detail from FIG. 11.

In both embodiments, the individual structures 70, 72 may define a channel 76, as shown in FIG. 6, or a hollow guide 78, as shown in FIG. 13. The channel 76 and the guide 78 support and direct the cable 62.

The channels 76 may extend across each individual structure 70. The channels 76 may extend across an outer surface of the individual structures 70. The channels 76 may be open faced channels such that they have two sides and a bottom surface, but no top surface. Thus, the channels 76 may receive and retain the cable 62 such as in snap-type, or friction fit fashion, but other securing or retaining structures may be used.

The cable 62 may be housed within a sheath or other structure, entirely or just partially. By way of example, the cable 62 may be housed within a sheath along structures 66, 68.

In FIGS. 6 and 7, the individual structures 70 may have a generally block form of a substantially rectangular shape. While one shape is mentioned, other shapes may be permissible. The individual structures 70 may be substantially the same in size, shape and features.

FIG. 13, for example, shows that the seat back structures 68 may take alternative shapes compared with FIGS. 6 and 7. In this embodiment, the individual structures 72 may be substantially the same in terms of size, shape and features. The individual structures 72 in FIG. 13 may have a base portion 80 and a central ridge 82. Angled ribs 84 may extend from either side of the central ridge 82 down to the base portion 80. A hollow guide 78 may be located on the central ridge 82.

The hollow guide 78 may be located on one or more of the individual structures 72. In some embodiments, the guides 78 are coplanar with one another and generally horizontally aligned. Each hollow guide 78 may only extend along a few angled ribs 84, thus each hollow guide 78 may only extend along a fraction of the length of an individual structure 72. The cable 62 is adapted to extend through one or more of the hollow guides 78.

In both embodiments, the cable 62 may extend from the seat back structures 66, 68 toward the biasing device 58. As may be appreciated from FIGS. 8 and 10, the cable 62 may be supported and guided by a second cable support 86. The cable 62 may be connected to the second cable support 86 near the seat frame 44 adjacent the biasing device 58. The second cable support 86 may be coplanar with the biasing device 58.

The second cable support 86 may have a retention feature 88, such as a hook, or the like. The retention feature 88 may be connected to an anchor 90 at or near the seat frame 44. The second cable support 86 may securely anchor that end of the cable 62 in a fixed, stationary manner.

From the above, may be appreciated that the cable 62 may, in some embodiments, be a continuous, single cable oriented generally in a loop within the seat system 42. It can also be appreciated then that when the biasing device 58 is engaged in one direction, it pulls on the cable 62. When the cable 62 is pulled, one of the effects is that for both of the embodiments in FIGS. 6-10 and 11-13, at least a portion of the seat back center section 50 may change shape. The shape change may be such as to increase or decrease the seat bolster portion, but other shape changes and positions of the seat may be accomplished as well. The cable 62 has this effect because it is fixed to the biasing device 58 at one end and fixed to the seat frame 44, or the like, on the other end. Thus, the biasing device 58 has the effect of taking up the slack in the cable between these two connection points. In these situations, the cable 62 may move the seat back structure 66, 68 when the cable moves causing them to move the seat back center section, such as to change the bolster position of the seat system 42. In some cases, the change is that the slack in the cable 62 is reduced which may cause the seat back structures 66, 68 to be drawn closer to one another along the length of the cable 62 by virtue of their connection with the cable. In other embodiments, it may cause the seat back structures 66, 68 to be urged forward away from the plane of the seat frame 44 adjacent the biasing device 58.

If the bolster position of the seat system 42 is to change again, such as be relaxed, the biasing device 58 may be engaged to move the opposite direction. The result is that the cable 62 is relaxed which causes the seat back structures 66, 68 to be relaxed. This may change how close the seat back structures 66, 68 are to one another and/or urge rearwardly toward the plane of the seat frame 44 adjacent the biasing device 58. It is also possible that the relaxing includes pushing the cable 62 with the biasing device 58 to achieve the same effect on the seat back structure 46.

In accordance with the provisions of the patent statutes, the present device and method have been described in what is considered to represent its preferred embodiments. However, it should be noted that the device and method can be practiced otherwise than as specifically illustrated and described without departing from its spirit or scope.

What is claimed is:

1. An adjustment device for a seat system, comprising:
at least one actuating element connected to at least one seat back structure extending at least partially across a flexible member, wherein the seat back structure comprises a plurality of vertically extending ribs and valleys and at least three laterally aligned rectangular blocks having the same shape as one another, wherein the ribs and the blocks are each one-piece, unitary and integrally formed with the flexible member, wherein each block laterally extends beyond a first rib and a second rib and a valley between the first and second ribs, wherein the adjustment device is configured to alter a contour of a seating surface of the seat system.

2. The adjustment device according to claim 1, wherein the seating surface is configured to engage at least a lumbar portion of an occupant of the seat system.

3. The adjustment device according to claim 1, wherein the adjustment device is actuated such that at least a portion of the at least one seat back structure moves a portion of said flexible member in one or more of an inward direction toward an occupant of the seat system and an outward direction away from the occupant of the seat system.

4. The adjustment device according to claim 3, wherein the portion of the flexible member is a lateral portion defining a bolster of the seat system.

5. The adjustment device according to claim 1, wherein the flexible member is formed from a thermoplastic elastomer.

6. The adjustment device according to claim 1, wherein the flexible member is a single, integrally formed, one-piece structure of a seatback structure of the seat system.

7. The adjustment device according to claim 1, wherein the at least one actuating element is coupled to a seat frame of the seat system by at least one guide structure.

8. The seat system according to claim 1, wherein the adjustment device is connected to an actuator or biasing device, wherein activation of the actuator or biasing device causes the adjustment device to alter the contour of the seating surface of the flexible member.

9. A seat system for a vehicle, comprising:
a seat frame;
a seatback structure coupled to the seat frame; and
an adjustment device coupled to the seat system and comprising an actuator or biasing device, and a cable extending at least partially across the seatback structure, wherein the seat back structure comprises a plurality of vertically extending ribs and valleys and at least three rectangular blocks having the same shape whose bases are each one-piece, unitary and integrally formed with a rear surface of the flexible member, wherein each block laterally extends beyond a first rib and a second rib and a valley between the first and second ribs, wherein the cable extends between top surfaces of the blocks, wherein lateral gaps formed by the vertically extending ribs and/or valleys between the blocks leaves the blocks otherwise unconnected, wherein the adjustment device is configured to alter a contour of a seating surface of the seatback structure.

10. An adjustment device for a seat system, comprising:
a biasing device;
a cable having one end connected to the biasing device and another end secured to a fixed position, the cable extending in a loop from the biasing device to the fixed position across a flexible seat back structure;
at least three laterally aligned solid blocks connected to the flexible seat back structure, wherein the blocks and a plurality of vertically extending ribs and valleys are formed with the flexible seat back structure, wherein each block laterally extends beyond a first rib and a second rib and a valley between the first and second ribs, wherein said cable is connected to each of said blocks through grooves extending below upper surfaces of the blocks.

11. The adjustment device of claim 10, wherein said cable is located within a groove on an upper surface of each of said seat back structures.

12. The adjustment device of claim 11, wherein said cable and said grooves are substantially coplanar and linear.

13. The adjustment device of claim 10, wherein said cable is located through hollow guides on an upper surface of each of said seat back structure.

14. The adjustment device of claim 13, wherein said seat back structures are constructed with a central ridge supported on both sides by a plurality of ribs.

15. The adjustment device of claim 14, wherein said hollow guides are located on said central ridge, said hollow guides and said cable being substantially coplanar and linear.

* * * * *